(12) United States Patent
Bourdev et al.

(10) Patent No.: US 7,580,563 B1
(45) Date of Patent: Aug. 25, 2009

(54) DETECTION OF OBJECTS IN AN IMAGE USING COLOR ANALYSIS

(75) Inventors: Lubomir D. Bourdev, San Jose, CA (US); Gregg D. Wilensky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 756 days.

(21) Appl. No.: 11/219,191

(22) Filed: Sep. 2, 2005

(51) Int. Cl.
*G06K 9/00* (2006.01)
(52) U.S. Cl. .................................. 382/165
(58) Field of Classification Search ............. 382/103, 382/115, 118, 154, 162, 165, 168, 170, 173, 382/174, 181, 190, 240, 285, 291; 348/77, 348/86, 135, 143, 149, 152
See application file for complete search history.

(56) References Cited

U.S. PATENT DOCUMENTS 6,829,384 B2 * 12/2004 Schneiderman et al. ..... 382/154
7,194,114 B2 * 3/2007 Schneiderman ............. 382/118

OTHER PUBLICATIONS

Schneiderman, Henry, "A Statistical Approach to 3D Object Detection Applied to Faces and Cars", *Robotics Institute, Carnegie Mellon University*, Pittsburg, PA 15213, CMU-RI-TR-00-06, (May 10, 2000), 106 pages.

* cited by examiner

*Primary Examiner*—Jose L Couso
(74) *Attorney, Agent, or Firm*—Schwegman, Lundberg & Woessner, P.A.

(57) ABSTRACT

According to some embodiments, a method, an apparatus and a system perform object detection in an image. In some embodiments, a method includes receiving an image. The method also includes detecting whether an object is in the image. The detecting comprises determining one or more features based on a projection for one or more pixels in the image, wherein the projection is dependent on a statistical probability of the colors of objects and non-objects at the one or more pixels in the image. The detecting also includes determining a likelihood value for the one or more features in the image.

29 Claims, 5 Drawing Sheets

FIG. 5 ized within subimages of the image. The color analysis module may output likelihood values for the subimages. Such likelihood values may be used by an object detection module to detect the object in the image. Some embodiments are described in reference to face detection. Embodiments are not so limited, as other types of objects may be detected (such as faces of animals, automobiles, objects in natures (e.g., trees), etc.).

DETECTION OF OBJECTS IN AN IMAGE USING COLOR ANALYSIS

TECHNICAL FIELD

The application relates generally to data processing, and, more particularly, to object detection in an image.

BACKGROUND

Detection of objects in an image or a sequence of images in a video sequence is applied to extract the locations of objects in the image, such as human faces, faces of animals, automobiles, objects in natures (e.g., trees), etc. The presence and location of objects is important for a wide range of image processing tasks. Examples of such image processing tasks may include a visual search, automatic categorization, color correction, auto-orientation, segmentation, compression, etc.

SUMMARY

According to some embodiments, a method, an apparatus and a system perform object detection in an image. In some embodiments, a method includes receiving an image. The method also includes detecting whether an object is in the image. The detecting comprises determining one or more features based on a projection for one or more pixels in the image, wherein the projection is dependent on a statistical probability of the colors of objects and non-objects at the one or more pixels in the image. The detecting also includes determining a likelihood value for the one or more features in the image.

In some embodiments, a method includes performing a statistical analysis of the objects in the set of sample images having an object. The method also includes performing a dimensionality reduction based on a color projection, using the statistical analysis, of pixels in the set of sample images having the object. The method includes performing a dimensionality reduction based on a color projection, using the statistical analysis, of pixels in a set of sample images not having the object. The method also includes storing the color projection for the pixels in the set of sample images having the object and the color projection for the pixels in the set of sample images not having the object.

In some embodiments, a method includes detecting an object in an image. The detecting includes receiving a subimage from the image. The detecting also includes performing the following operations for a subset of pixels in the subimage. A first operation includes assigning likelihood values to pixels in the subset, independently, wherein the likelihood values are representative of a likelihood that a color projection, which is dependent on a statistical probability of the colors of objects and non-objects at the pixels in the image, of the pixel is representative of an object. A second operation includes summing the likelihood values of the pixels in the subset to create a summed value, wherein the summed value is used to determine whether the subimage contains the object.

In some embodiments, a system includes a color analysis module to detect an object in subimages of the image using a color projection, which is dependent on a statistical probability of the colors of objects and non-objects at the pixels in the image, of individual pixels in the subimages. The color analysis module outputs likelihood values for the subimages. The system also includes an object detection module to detect the object in the image using the likelihood values from the color analysis module.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Methods, apparatus and systems for object detection in an image are described. In the following description, numerous specific details are set forth. However, it is understood that embodiments of the invention may be practiced without these specific details. In other instances, well-known circuits, structures and techniques have not been shown in detail in order not to obscure the understanding of this description. Additionally, in this description, the phrase "exemplary embodiment" means that the embodiment being referred to serves as an example or illustration.

Some embodiments detect objects in an image. Some embodiments process windows within the image. In some embodiments, a window is defined as a subimage in an image with a fixed aspect ratio, which is analyzed for the presence of the object. Object detection may be performed by processing windows from a comprehensive set of positions, scales and orientations in the image. For a given window, some embodiments assign a likelihood that the window contains an object. If the likelihood is large enough, the window is designated as containing the object.

Object likelihood values may be assigned to each pixel individually based on a comparison of color distributions for objects and non-objects. In some embodiments, faster evaluations are performed by not processing pixels whose color distribution for the objects is too similar to the color distribution for non-objects. Moreover, robustness to partial image occlusion may be obtained by not using pixels having low likelihood values in the detection determination. Some embodiments operate in a two-dimensional color chromaticity space that factors out luminance. For face detection, such embodiments may be more sensitive to discriminating skin tone from non-skin tone Some embodiments include a color analysis module that may be applied to allow for a more accurate detection of an object in an image. The color analysis module may accommodate a large variability in color that may be caused by partial occlusion, pose, expression, color cast, etc. In some embodiments, the analysis module processes individual pixels in the image. The color analysis module may account for the relative position of the pixel in determining its expected color. For example, for a frontal face detector, some embodiments assume a tighter fit to skin tone in areas around the cheeks, while allowing for red and white in areas around the mouth.

Some embodiments may take into account the discriminating capability of each pixel within a window. For example, the color close to the center of the window may be more important in determining the likelihood that the window contains a face than the color around the edge (which may be from an arbitrary background).

Some embodiments may train a color analysis module based on both the positional and color information for individual pixels. Bayes framework may be used to capture object and non-object color similarity distributions for each pixel individually. Moreover, a Naïve Bayes classifier may be used to reduce the dimensionality of the search space as part of the training of the color detector.

This description of the embodiments is divided into three sections. The first section describes an example operating environment and system architecture. The second section describes example operations. The third section provides some general comments.

Hardware, Operating Environment and System Architecture

This section provides an example system architecture in which embodiments of the invention can be practiced. This section also describes an example computer system. Operations of the system components will be described in the next section.

Example System Architecture

Figure 1:
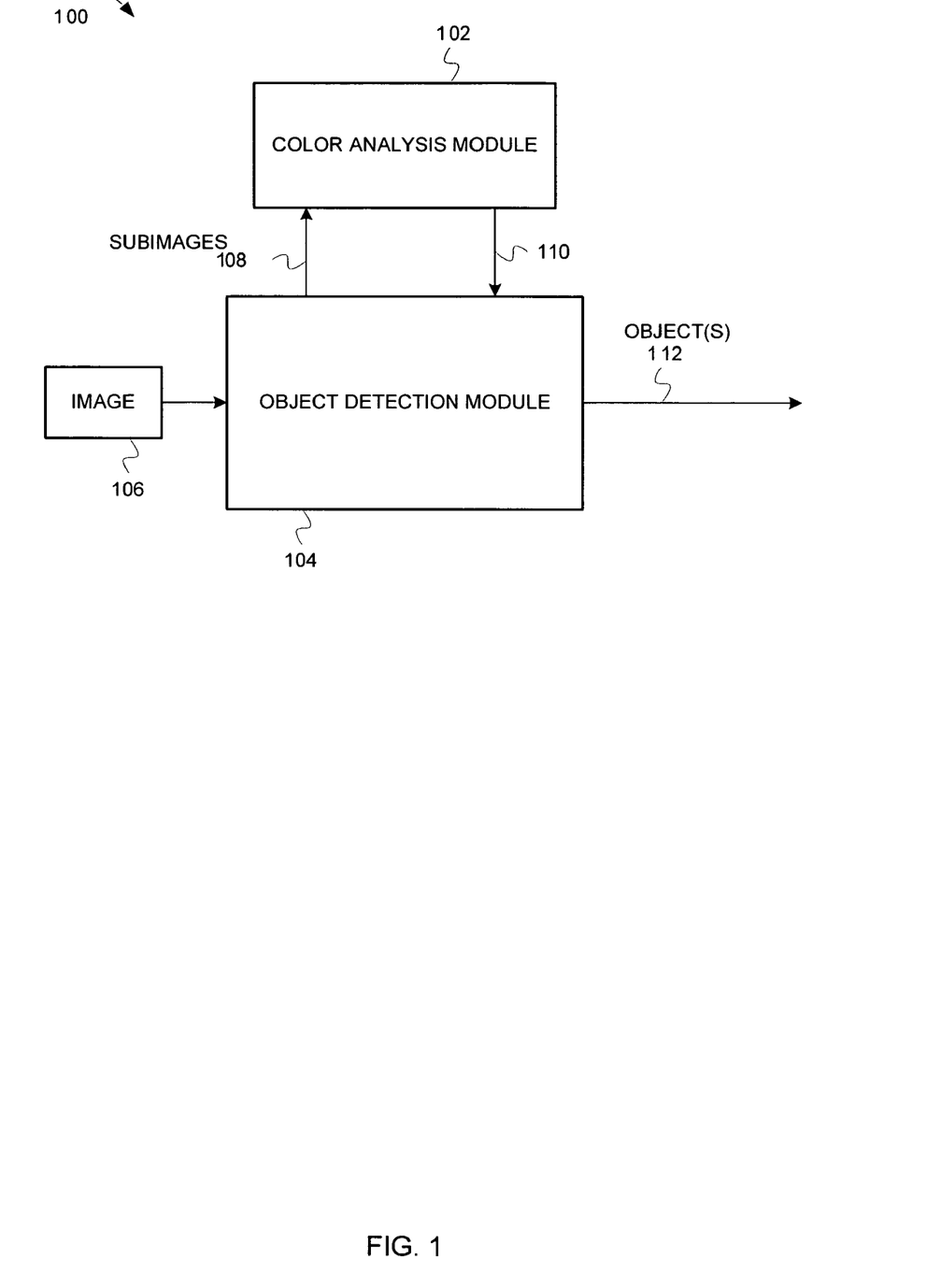
FIG. 1 illustrates a system for object detection in an image using color analysis, according to some embodiments of the invention.

FIG. 1 illustrates a system for object detection in an image using color analysis, according to some embodiments of the invention. In particular, FIG. 1 illustrates a system 100 that includes an object detection module 104 and a color analysis module 102. The object detection module 104 is coupled to receive an image 106. The object detection module 104 outputs locations of object(s) 112 that are detected in the image. The image may be a number of different types of objects. For example, the object(s) may be faces of persons or animals (such as dogs, cats, etc.). The object(s) may also include persons, animals, flowers, trees, different types of inanimate objects (such as automobiles, clothes, office equipment, etc.), etc.

The object detection module 104 is coupled to output sub-images (parts of the image 106) 108 to the color analysis module 102. The color analysis module 102 is to process the subimages 108. As further described below, the color analysis module 102 processes the subimages 108 and determines the likelihood that these subimages 108 contain a given object therein. The color analysis module 102 may output likelihood values 110 (which indicate the likelihood that the subimage contains the object). The likelihood values are input back to the object detection module 104.

The object detection module 104 may use the indications 110 to detect objects in the image. In other words, the object detection module 104 may perform other processes to detect the objects in the image 106. The indications 110 may be used as an additional heuristic in the detection of objects.

The system 100 may be representative of any apparatus, computer device, etc. For example, the system 100 may be a desktop computer, notebook computer, Personal Digital Assistant (PDA), a cellular telephone, etc. The object detection module 104 and the color analysis module 102 may be representative of software, hardware, firmware or a combination thereof. For example, the object detection module 104 and the color analysis module 102 may be software to be executed on a processor (not shown). An example of an apparatus having this architecture is described in FIG. 2 below.

Example Computer System

Figure 2:
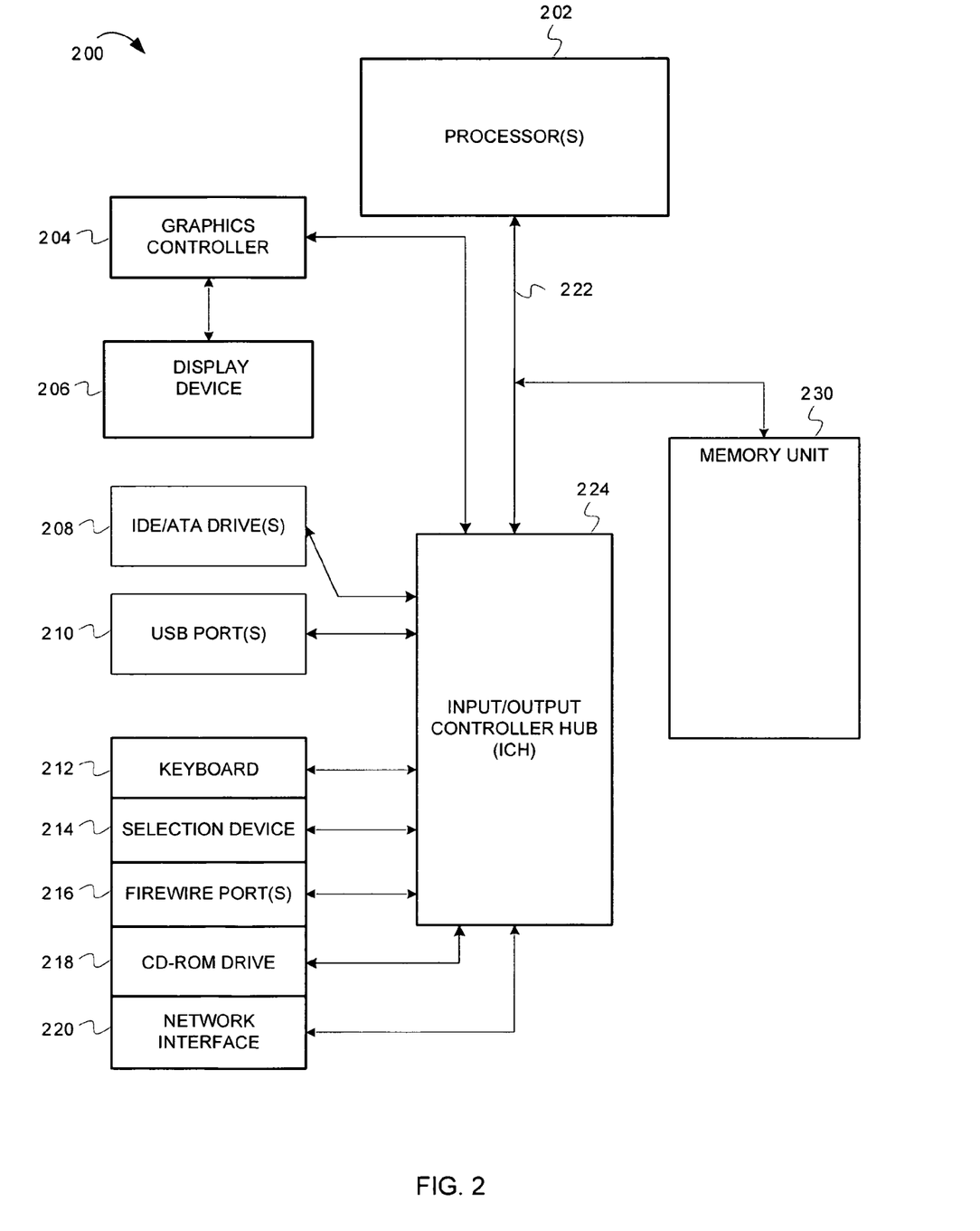
FIG. 2 illustrates a computer device that executes software for performing operations related to detection of objects in an image, according to some embodiments of the invention.

FIG. 2 illustrates a computer device that executes software for performing operations related to detection of objects in an image, according to some embodiments of the invention. As illustrated in FIG. 2, the computer system 200 comprises processor(s) 202. The computer system 200 also includes a memory unit 230, processor bus 222, and Input/Output controller hub (ICH) 224. The processor(s) 202, memory unit 230, and ICH 224 are coupled to the processor bus 222. The processor(s) 202 may comprise any suitable processor architecture. The computer system 200 may comprise one, two, three, or more processors, any of which may execute a set of instructions in accordance with embodiments of the invention.

The memory unit 230 may store data and/or instructions, and may comprise any suitable memory, such as a dynamic random access memory (DRAM). The computer system 200 also includes IDE drive(s) 208 and/or other suitable storage devices. A graphics controller 204 controls the display of information on a display device 206, according to some embodiments of the invention.

The input/output controller hub (ICH) 224 provides an interface to I/O devices or peripheral components for the computer system 200. The ICH 224 may comprise any suitable interface controller to provide for any suitable communication link to the processor(s) 202, memory unit 230 and/or to any suitable device or component in communication with the ICH 224. For one embodiment of the invention, the ICH 224 provides suitable arbitration and buffering for each interface.

For some embodiments of the invention, the ICH 224 provides an interface to one or more suitable integrated drive electronics (IDE) drives 208, such as a hard disk drive (HDD) or compact disc read only memory (CD ROM) drive, or to suitable universal serial bus (USB) devices through one or more USB ports 210. For one embodiment, the ICH 224 also provides an interface to a keyboard 212, a mouse 214, a CD-ROM drive 218, one or more suitable devices through one or more firewire ports 216. For one embodiment of the invention, the ICH 224 also provides a network interface 220 though which the computer system 200 can communicate with other computers and/or devices.

In some embodiments, the computer system 200 includes a machine-readable medium that stores a set of instructions (e.g., software) embodying any one, or all, of the methodologies for described herein. Furthermore, software may reside, completely or at least partially, within memory unit 230 and/ or within the processor(s) 202.

System Operations

This section describes operations performed by embodiments of the invention. In certain embodiments, the operations are performed by instructions residing on machine-readable media (e.g., software), while in other embodiments, the methods are performed by hardware or other logic (e.g., digital logic).

Figure 3:
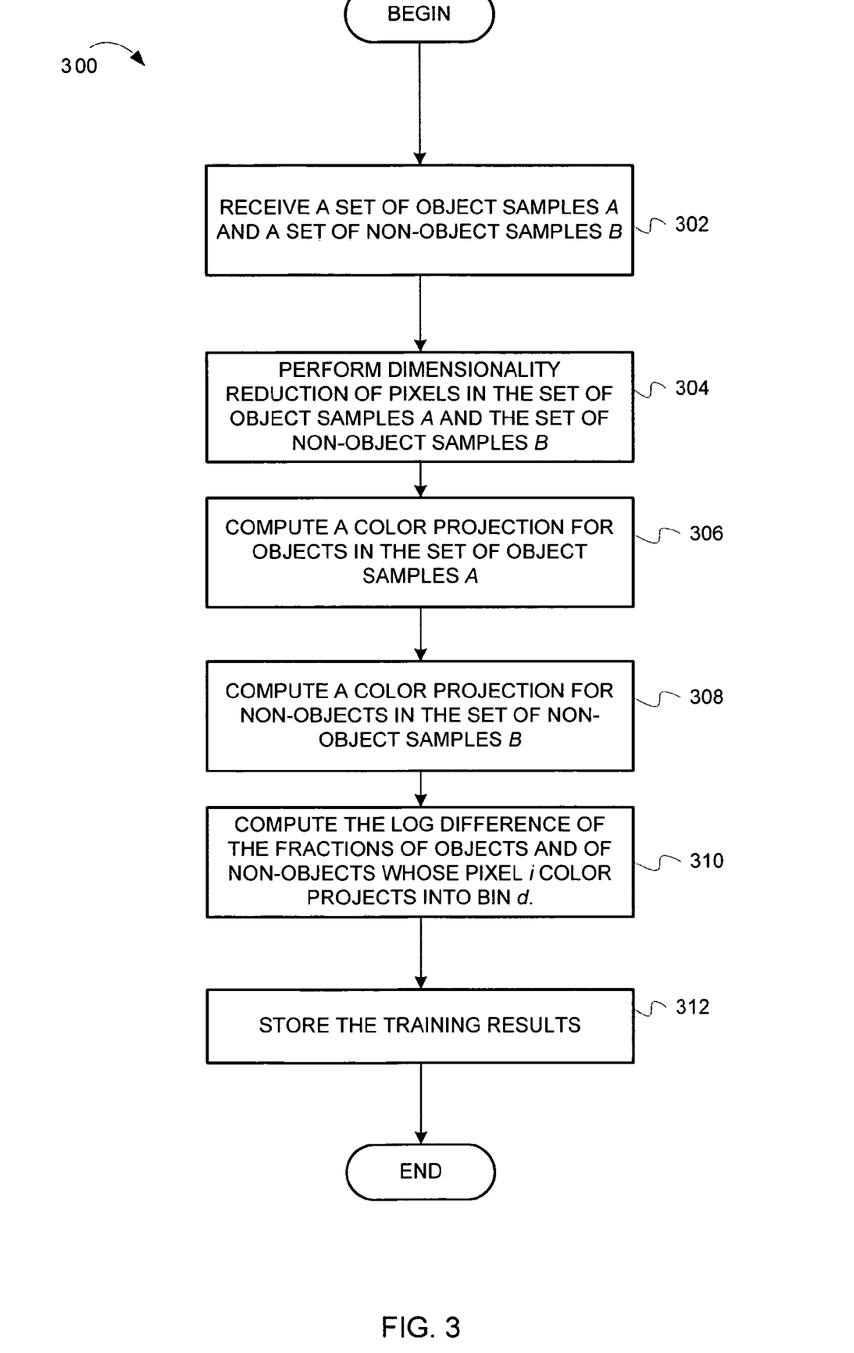
FIG. 3 illustrates a flow diagram for training for color analysis for object detection in an image, according to some embodiments of the invention.
Figure 4:
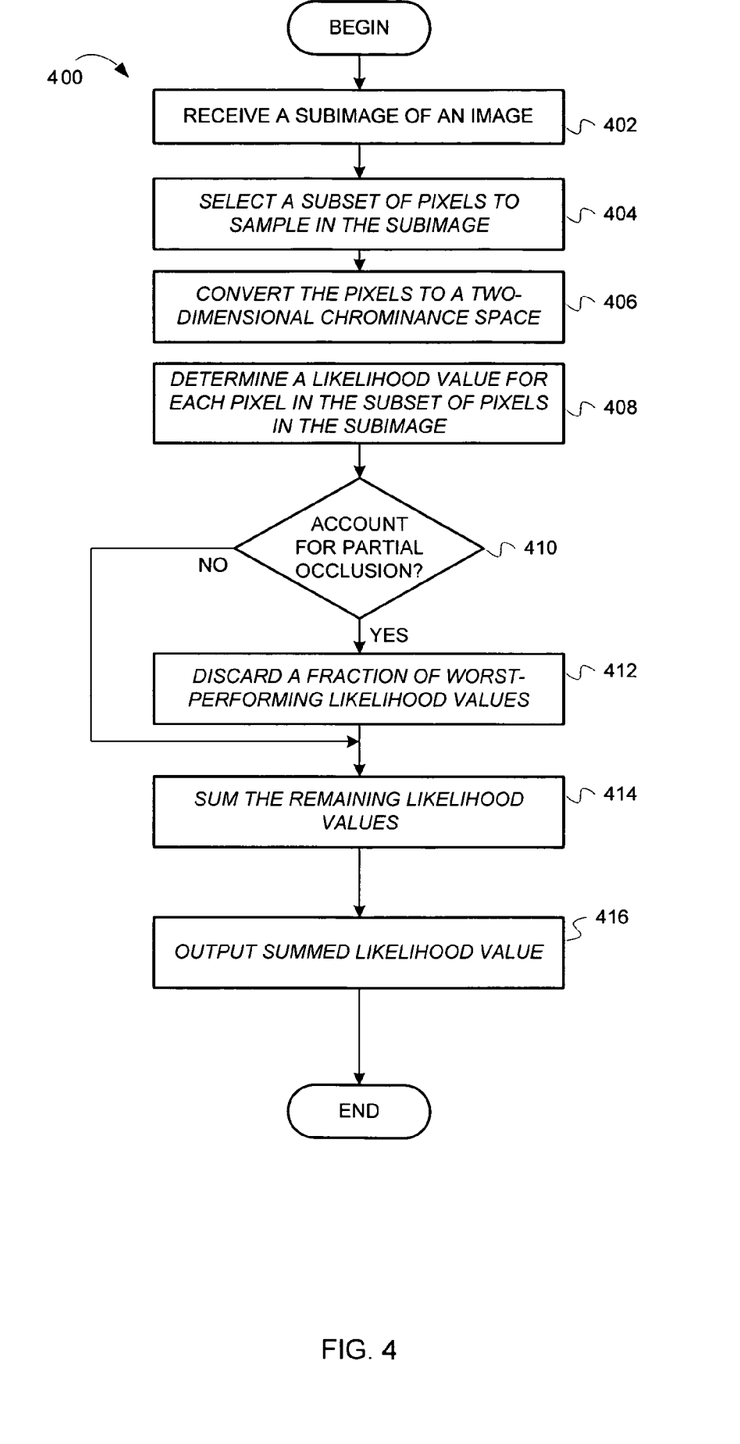
FIG. 4 illustrates a flow diagram for color analysis for object detection in an image, according to some embodiments of the invention.
Figure 5:
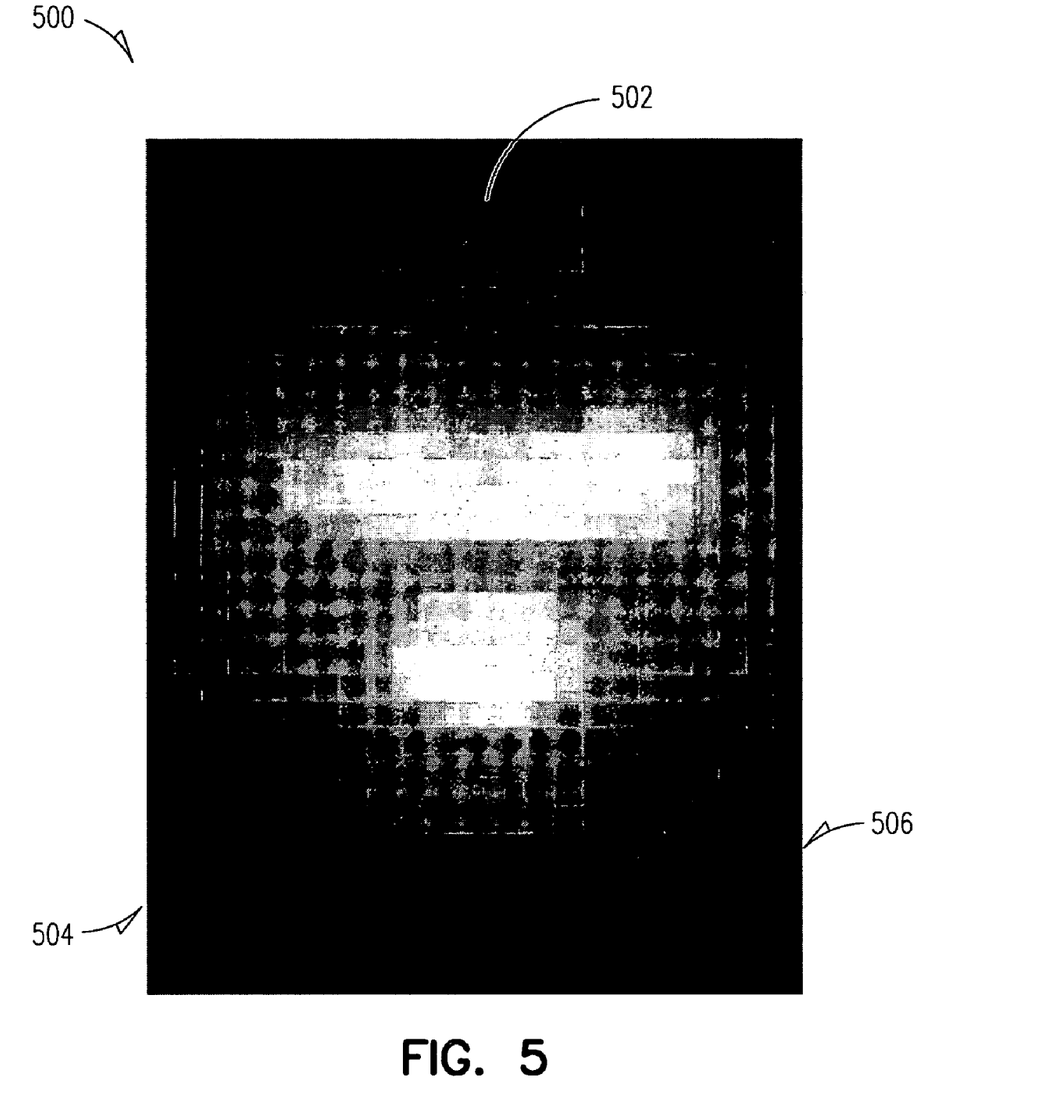
FIG. 5 illustrates pixel correlation between faces and non-faces in a training set, according to some embodiments of the invention.

In this section, FIGS. 3-5 are discussed. In particular, FIG. 3 describes operations for generating a training set for color analysis for object detection in an image. FIG. 4 describes operations to perform object detection in an image that includes color analysis. FIG. 5 illustrates pixel correlation between faces and non-faces in a training set. This description proceeds with a discussion of FIG. 3.

FIG. 3 illustrates a flow diagram for training for color analysis for object detection in an image, according to some embodiments of the invention. The flow diagram 300 is described with reference to the components of FIG. 1. The flow diagram 300 commences at block 302.

At block 302, a set of object samples A and a set of non-object samples B are received. In some embodiments, the color analysis module 102 receives the set of object samples A and a set of non-object samples B. For example, the color analysis module 102 may receive one to a number of subimages that contain faces. The color analysis module 102 may then receive one to a number of subimages that do not contain faces. The flow continues at block 304.

At block 304, dimensionality reduction is performed for the pixels in the set of object samples A and a set of non-object samples B. In some embodiments, the color analysis module 102 may perform the dimensionality reduction. In some embodiments, the subimage is transformed to a rectangle of fixed dimensions (e.g., 20×30 block of pixels). Assume that X is the set of pixels within the rectangle and $c_i$, $i \in X$ be the set of their respective colors therein. Assume that F indicates the presence of an object. In some embodiments, the subimage may contain an object if equation (1) is true:

$$P(F/C) > 0.5 \qquad (1)$$

Accordingly, equation (1) determines whether the probability of having an object in the subimage is greater than 50%. Using Bayes Theorem, the probability of having an object in the subimage is defined in equation (2)

$$P(F/C) = \frac{P(C/F)P(F)}{P(C/F)P(F) + P(C/\neg F)P(\neg F)} \qquad (2)$$

wherein P(C|F) is the probability that there is a given set of color values C, assuming that there is an object in the subimage. P(F) is the overall probability that a given subimage contains the object. P(F) (termed the prior probability) captures the general frequency of occurrence of objects. P(C|¬F) is the probability that there is a set of color values assuming that there is no object in the subimage. P(¬F) is the probability that there are no objects. P(¬F) captures the frequency of occurrence of non-objects without taking into account the color of pixels. Using equation (2), equation (1) may be rewritten as equation (3):

$$\frac{P(C/F)}{P(C/\neg F)} > \frac{P(\neg F)}{P(F)} = \lambda' \qquad (3)$$

The right side of the inequality (P(¬F)/P(F)) is a ratio of prior probabilities, which is a constant with regard to color data. Therefore, this ratio may be replaced with $\lambda'$, which is a parameter to control the ratio between detection rate and false positive rate. The color information C is the color at each pixel. Assuming eight bit RGB color, the space of all C may be very large. Thus, performing the color analysis may be impractical. Therefore, the color analysis module 102 performs dimensionality reduction. In some embodiments, to reduce the dimensionality, the color analysis module 102 may project the color $c_i$ of each pixel into a scalar space and discretize the pixel into one of D possible values ($w_i(c_i) \in D$). In some embodiments, to reduce the dimensionality, the color analysis module 102 may use a Naïve Bayes Classifier. In other words, the color analysis module 102 may assume that the colors of any pair of pixels are statistically independent. Thus, equation (3) may be represented as a product of ratios shown in equation (4):

$$\frac{P(C/F)}{P(C/\neg F)} = \prod_{i \in X} \frac{P(i, w_i(c_i)/F)}{P(i, w_i(c_i)/\neg F)} > \lambda' \qquad (4)$$

Such assumptions allow a reduction in dimensionality to D*|X|, wherein D is the possible color values and X is the set of pixels. In some embodiments, equation (4) may be converted into equation (5), by taking the log of both sides and substituting $\lambda = \log(\lambda')$:

$$\sum_{i \in X} (\log P(i, w_i(c_i)/F) - (\log P(i, w_i(c_i)/\neg F) > \lambda' \qquad (5)$$

Therefore, the dimensionality reduction may be performed using equation (5). The flow continues at block 306.

At block 306, a color projection is computed for individual pixels for objects in the object samples A. In some embodiments, the color analysis module 102 may perform this computation. The color analysis module 102 may compute a color projection for an individual pixel, independent of other pixels. In some embodiments, the color analysis module 102 may compute a histogram for each pixel i across a number of bins d for all objects from the object samples A. In some embodiments, the number of bins d may be 3, 4, 8, 16, 32, 64, 128, etc. The flow continues at block 308.

At block 308, a color projection is computed for individual pixels for non-objects in the non-object samples B. In some embodiments, the color analysis module 102 may perform this computation. The color analysis module 102 may compute a color projection for an individual pixel, independent of other pixels. In some embodiments, the color analysis module 102 may compute a histogram for each pixel i across a number of bins d for all non-objects from the non-object samples B. The flow continues at block 310.

At block 310, the log difference of fractions of objects and of non-objects whose pixel i color projects into bin d is computed. In some embodiments, the color analysis module 102 may perform this computation. The color analysis module 102 may compute the log difference of the fractions of objects and of non-objects whose pixel i color projects into bin d, based on equation (6):

$$L_{i,d} = \log E_{j \in A}([w_i(c_{i,j}) = d]) - \log E_{j \in B}([w_i(c_{i,j}) = d]) \qquad (6)$$

Wherein E stands for mathematical expectation and [Pred] for a given predicate Pred is zero if Pred is false and one otherwise. The flow continues at block 312.

At block 312, the training results for each bin d and each pixel i are stored. In some embodiments, the color analysis module 102 may store these results into a number of different types data structures and different types of storage (examples of which are set forth in the description of FIG. 2). The operations of the flow diagram 300 are complete.

Operations that use the training results for performing color analysis for object detection in an image, in accordance with some embodiments, are now described. In particular, FIG. 4 illustrates a flow diagram for color analysis for object detection in an image, according to some embodiments of the invention. The flow diagram 400 is described with reference to the components of FIG. 1. The flow diagram 400 is described with reference to the processing of one subimage for the determination of the likelihood that an object is therein. However, such operations may be performed for a number of such subimages. For example, such operations may be performed for all of the subimages in an image. The flow diagram 400 commences at block 402.

At block 402, a subimage of an image is received. In some embodiments, the color analysis module 102 may receive this subimage. With reference to FIG. 1, the object detection module 104 may receive the image 106. The object detection module 104 may then partition the image 106 into a number of subimages. For example, the object detection module 104 may scale the image into an image of fixed size (e.g., 24×32 pixels, 10×20 pixels, etc.). The object detection module 104 may then transmit the subimage to the color analysis module 102. The flow continues at block 404.

At block 404, a subset of pixels in the subimage is selected. In some embodiments, the color analysis module 102 may perform this selection. In some embodiments, the color analysis module 102 may select every pixel in the subimage. In some embodiments, the color analysis module 102 may select a subset of pixels that are non-adjacent. Specifically, in some embodiments, the statistical independence assumption of the Naïve Bayes classifier may be especially weak for neighboring pixels. In some embodiments, the color analysis module 102 may select pixels from a rectangular grid of step two. For example, a rectangular grid of step two are those pixels whose X and Y coordinates are even.

In some embodiments, some pixels may be more discriminating than others. For example, FIG. 5 illustrates pixel correlation between faces and non-faces in a training set, according to some embodiments of the invention. In particular, a subimage 500 illustrates that a center 502 and an edge 504 and an edge 506. Lighter color corresponds to pixels with smaller correlation between faces and non-faces. Accordingly, pixels towards the center 502 are much more discriminating than others. The pixels around the edges 504 and 506 may be from an arbitrary background. Therefore in some embodiments to increase the time of execution, the color analysis module 102 may select pixels having correlation coefficients between the object and non-object histograms that are lower than a given threshold.

In some embodiments, the color analysis module 102 may select the subset of pixels based on a combination of the pixel locations relative to each other (e.g., sampling non-adjacent pixels) and the correlation coefficients. In some embodiments, the color analysis module 102 may select the subset of pixels based on the pixel locations relative to each other. In some embodiments, the color analysis module 102 may select the subset of pixels based on the correlation coefficients. The subset of pixels may be defined as $\chi$. The flow continues at block 406.

At block 406, each pixel in the subset of pixels in the subimage is converted to a chrominance color space. In some embodiments, the color analysis module 102 may perform this conversion. In some embodiments, the subimage may be received in the RGB color space. Therefore, the color analysis module 102 may convert the subimage from the RGB color space to the YUV color space. Moreover, in some embodiments, the color analysis module 102 may remove the luminance component of the YUV conversion. Accordingly, the color of each pixel is represented by a two-dimensional value using the U and V components of the chrominance color space—which is denoted by q(c). Alternatively, in some embodiments, all three YUV components are used. Moreover, embodiments are not limited to the use of the YUV color space. In some embodiments, the pixels may be in other color spaces (e.g., RGB color space). Therefore, the conversion may or may not be performed. The flow continues at block 408.

At block 408, a likelihood value is determined for each pixel in the subset of pixels. In some embodiments, the color analysis module 102 may perform this determination. While the operations are described with reference to determining a likelihood value for each pixel, in some embodiments, a likelihood value may be determine for one or more features based on a projection for the one or more features in the image. In some embodiments, a feature is defined as the projection and discretization of the color of a given pixel. The feature value for a given pixel is the bin that corresponds to the color of the pixel. A more detail description of this projection and discretization, according to some embodiments, is now described.

Accordingly, the color analysis module 102 may process each pixel, independent of the other pixels in the subset. In particular, the color analysis module 102 determines the likelihood value of each pixel independent of the other pixels in the subset. In some embodiments, the color analysis module 102 may fit a Gaussian over the expected color of the object in the chrominance space. Each pixel may have a different Gaussian. The center of the Gaussian, $u_i$, is determined by equation (7):

$$\mu_i = E_{j \in A} q(c_{i,j}) \qquad (7)$$

wherein $E_{j \in A}$ is the weighted average of the color value, and $q(c_{i,j})$ is the color, c, transformed into the chrominance space. In general, the less discriminating pixels have a less tight Gaussian (and thus a higher standard deviation). The standard deviation, $\sigma_i$, is calculated based on equation (8):

$$\sigma_i = \sqrt{E_{j \in A}(q(c_{i,j})^2) - \mu_i^2} \qquad (8)$$

A likelihood value, $w_i(c)$, for a given pixel may then be determined by equation (9):

$$w_i(c) = \lfloor |(q(c) - \mu_i)/\sigma_i| \rfloor \qquad (9)$$

wherein |x| denotes Euclidian distance of value $x = \{x_a, x_b\}$ in chrominance space: |x|, calculated based on equation (10):

$$|x| = \sqrt{x_a^2 + x_b^2} \qquad (10)$$

Also, $\lfloor x \rfloor$ denotes discretization of scalar x into one of D values. A likelihood value, $w_i(c)$, indicates how far this pixel color is from a color at the pixel location if an object is in the subimage. The likelihood value, $w_i(c)$, is measuring the distance from the center of the Gaussian divided by the standard deviation. Accordingly, the color analysis module 102 determines the likelihood value for each of the number of pixels in the subset. The flow continues at block 410.

At block 410, a determination is made of whether to account for partial occlusion. In some embodiments, the color analysis module 102 may make this determination. As further described below, in some embodiments, the likelihood values are summed together. The sum may then be compared to a threshold value to determine whether an object is contained in the subimage. If a significant portion of the objects get occluded by an arbitrary color, its log likelihood values are likely to drive the sum below the threshold. Therefore, in some embodiments, the color analysis module 102 determines whether to account for partial occlusion. In some embodiments, the color analysis module 102 may make this determination based on the type of images being processed, the type of objects being detected, etc. If partial occlusion is to be accounted for, the flow continues at block 412. Otherwise, the flow continues at block 414.

At block 412, a fraction of the worst-performing likelihood values are discarded. In some embodiments, the color analysis module 102 may discard a fraction of the worst-performing likelihood values. In particular, a fraction is discarded to accommodate occlusion. In some embodiments, the fraction to discard may be empirically determined as the fraction that results in the highest accuracy over the training samples. The flow continues at block 414.

At block 414, the remaining likelihood values are summed. In some embodiments, the color analysis module 102 may perform this summing operation. If occlusion is not taken into account, the color analysis module 102 may perform this operation based on equation (11):

$$\sum_{i \in X} L_{i,w_i(c_i)} > \lambda \quad (11)$$

Accordingly, the color analysis module 102 performs a summation of the likelihood values of all of the pixels in the subimage. Alternatively, if occlusion is taken into account, the color analysis module 102 may perform this operation based on equation (12):

$$\sum_j \max_{i \in x}^{K}(L_{i,w_i,(c_i)}) > \lambda \quad (12)$$

wherein K is the maximum values of set X. Thus, the color analysis module 102 performs a summation over the likelihood values of those pixels having likelihood values that are within the range not to be discarded. For example, the color analysis module 102 may sum over the top 50%, top 70%, top 80%, etc. The flow continues at block 416.

At block 416, the summed likelihood value is output. In some embodiments, the color analysis module 102 may output the summed likelihood value. In some embodiments, the color analysis module 102 may output the summed likelihood value, which is input back into the object detection module 104. In some embodiments, the object detection module 104 may use this summed likelihood value together with other heuristics to determine whether an object is contained therein. Alternatively, the object detection module 104 may use this summed likelihood value alone to determine whether an object is contained therein. The operations of the flow diagram 400 are complete.

General

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for object detection in an image, in accordance with some embodiments of the invention. A number of flow diagrams illustrate the operations for object detection in an image, in accordance with some embodiments of the invention. The operations of the flow diagram are described with references to the systems/apparatus shown in the block diagrams. However, it should be understood that the operations of the flow diagram could be performed by embodiments of systems and apparatus other than those discussed with reference to the block diagrams, and embodiments discussed with reference to the systems/apparatus could perform operations different than those discussed with reference to the flow diagram.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method comprising:
executing instructions stored on a computer-readable medium readable by a processor which when executed cause the processor to perform operations comprising, receiving an image; and
detecting whether an object is in the image, wherein the detecting comprises,
determining one or more features based on a projection for one or more pixels in the image, wherein the projection is dependent on a statistical probability of the colors of objects and non-objects at the one or more pixels in the image, wherein the one or more features include a projection and discretization of a color for the one or more pixels; and
determining a likelihood value for the one or more features in the image.

2. The method of claim 1, wherein the projection of one pixel is independent of other pixels in the image.

3. The method of claim 1, wherein determining one or more features comprises processing a pixel associated with a feature of the one or more features, wherein the processing comprises converting the pixel to a two-dimensional chrominance space.

4. The method of claim 1, wherein detecting whether the object is in the image further comprises:
selecting a subset of the one or more features in a subimage of the image;
determining a likelihood value for each feature in the subset, independent of other features in the subset.

5. The method of claim 4, wherein detecting whether the object is in the image further comprises:
discarding a fraction of the likelihood values for the features in the subset that are the worst performing, to form remaining likelihood values; and
summing the remaining likelihood values for the features in the subset to create a summed value.

6. The method of claim 5, wherein the summed value is used to determine whether the image contains the object.

7. The method of claim 4, wherein detecting whether the object is in the image further comprises summing the likelihood values for the features in the subset to create a summed value, wherein the summed value is used to determine whether the image contains the object.

8. The method of claim 4, wherein selecting the subset of the number of features comprises selecting pixels in the subimage that are more than one pixel apart.

9. The method of claim 4, wherein selecting the subset of the one or more features comprises selecting features having correlation coefficients that are smaller than a threshold.

10. The method of claim 1, wherein the object comprises a face of a person.

11. A method comprising:
executing instructions stored on a computer-readable medium readable by a processor which when executed cause the processor to perform operations comprising,
performing a statistical analysis of the objects in the set of sample images having an object;
performing a dimensionality reduction based on a color projection, using the statistical analysis, of pixels in the set of sample images having the object;
performing a dimensionality reduction based on a color projection, using the statistical analysis, of pixels in a set of sample images not having the object; and
storing the color projection for the pixels in the set of sample images having the object and the color projection for the pixels in the set of sample images not having the object;
detecting the object in a subimage of an image using the color projection for the pixels in the set of sample images having the object and the color projection for the pixels in the set of sample images not having the object, wherein detecting the object comprises,
assigning likelihood values to pixels in the subimage, wherein the likelihood values are representative of a likelihood that the color projection of the pixel is representative of the object; and
summing the likelihood values of the pixels in the subimage to create a summed value, wherein the summed value is used to determine whether the subimage contains the object.

12. The method of claim 11, wherein the operations comprise performing a statistical analysis of the objects in the set of sample images not having the object,
wherein performing the dimensionality reduction of pixels in the set of sample images having the object comprises performing the dimensionality reduction, using the statistical analysis of the objects in the set of sample images not having the object, of the pixels in the set of sample images having the object, and
wherein performing the dimensionality reduction of pixels in the set of sample images not having the object comprises performing the dimensionality reduction, using the statistical analysis of the objects in the set of sample images not having the object, of the pixels in the set of sample images not having the object.

13. The method of claim 11, wherein performing the dimensionality reduction of pixels in the set of sample images having the object comprises performing the dimensionality reduction using a Naïve Bayes classifier.

14. The method of claim 11, wherein performing the dimensionality reduction of pixels in the set of sample images not having the object comprises performing the dimensionality reduction using a Naïve Bayes classifier.

15. The method of claim 11, wherein performing the dimensionality reduction of pixels in the set of sample images having the object comprises projecting the color of pixels into a scalar space.

16. The method of claim 11, wherein performing the dimensionality reduction of pixels in the set of sample images not having the object comprises projecting the color of pixels into a scalar space.

17. The method of claim 11, wherein the operations comprise detecting the object in a subimage of an image using the color projection for the pixels in the set of sample images having the object and the color projection for the pixels in the set of sample images not having the object.

18. A computer-readable medium that provides instructions which, when executed by a computer, cause said computer to perform operations comprising:
detecting an object in an image, wherein the detecting comprises:
receiving a subimage from the image;
performing the following operations for a subset of pixels in the subimage:
assigning likelihood values to pixels in the subset, independently, wherein the likelihood values are representative of a likelihood that a color projection, which is dependent on a statistical probability of the colors of objects and non-objects at the pixels in the image, of the pixel is representative of an object; and summing the likelihood values of the pixels in the subset to create a summed value, wherein the summed value is used to determine whether the subimage contains the object.

19. The computer-readable medium of claim 18, wherein the subset comprises all of the pixels in the subimage.

20. The computer-readable medium of claim 18, wherein the subset comprises non-adjacent pixels in the subimage.

21. The computer-readable medium of claim 18, wherein assigning the likelihood values to pixels comprises:

fitting a Gaussian over an expected color of the object; and
projecting a color of the pixel as a normalized distance to the center of the Gaussian.

22. The computer-readable medium of claim 21, wherein fitting the Gaussian over the expected color space of the object comprises fitting the Gaussian over the expected color space of the object in a two-dimensional chrominance space.

23. A system comprising:

a color analysis module, executable by a processor based on instructions stored on a computer-readable medium, to detect an object in subimages of the image using a color projection, which is dependent on a statistical probability of the colors of objects and non-objects at the pixels in the image, of individual pixels in the subimages, the color analysis module to output likelihood values for the subimages; and an object detection module, executable by the processor based on instructions stored on the computer-readable medium, to detect the object in the image using the likelihood values from the color analysis module.

24. The system of claim 23, wherein the color analysis module, executable by the processor based on instructions stored on the computer-readable medium, is to convert the individual pixels to a chrominance color space to detect the object in the subimages.

25. The system of claim 23, wherein the color analysis module, executable by the processor based on instructions stored on the computer-readable medium, is to select a subset of the individual pixels in the subimages and to determine likelihood values for the individual pixels to detect the object in the subimages.

26. The system of claim 25, wherein the color analysis module, executable by the processor based on instructions stored on the computer-readable medium, is to sum the likelihood values for the individual pixels in the subset to create a summed value to detect the object in the subimages.

27. The system of claim 26, wherein the object detection module, executable by the processor based on instructions stored on the computer-readable medium, is to mark the subimage as containing the object, in response to a determination that the summed value for a subimage exceeds a threshold.

28. The system of claim 25, wherein the subset of the individual pixels comprises non-adjacent pixels in the subimage.

29. The system of claim 25, wherein the subset of the individual pixels comprises pixels having correlation coefficients that are smaller than a threshold in the subimage.

* * * * *

UNITED STATES PATENT AND TRADEMARK OFFICE
CERTIFICATE OF CORRECTION

PATENT NO. : 7,580,563 B1
APPLICATION NO. : 11/219191
DATED : August 25, 2009
INVENTOR(S) : Bourdev et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1012 days.

Signed and Sealed this

Fourteenth Day of September, 2010

David J. Kappos
*Director of the United States Patent and Trademark Office*